INVENTORS
ALBERT R. KAUFMANN
ARTHUR L. GEARY
BY

July 4, 1967   A. R. KAUFMANN ET AL   3,329,744
METHOD FOR MAKING DISPERSION TYPE BODIES
Filed June 29, 1962   9 Sheets-Sheet 2

INVENTORS
ALBERT R. KAUFMANN
ARTHUR L. GEARY
BY
G. Eugene Dacey

INVENTORS
ALBERT R. KAUFMANN
ARTHUR L. GEARY

INVENTORS
ALBERT R. KAUFMANN
ARTHUR L. GEARY
BY

July 4, 1967          A. R. KAUFMANN ET AL          3,329,744

METHOD FOR MAKING DISPERSION TYPE BODIES

Filed June 29, 1962          9 Sheets-Sheet 9

INVENTORS
ALBERT R. KAUFMANN
ARTHUR L. GEARY
BY

3,329,744
METHOD FOR MAKING DISPERSION TYPE BODIES
Albert R. Kaufmann, Lexington, and Arthur L. Geary, Arlington, Mass., assignors, by mesne assignments, to Whittaker Corporation, Los Angeles, Calif., a corporation of California
Filed June 29, 1962, Ser. No. 206,260
2 Claims. (Cl. 264—.5)

The present invention relates generally to a method for making dispersion type bodies and, more particularly, to a method for making dispersion type fuel elements for use in nuclear reactors from powders of dissimilar densities.

An ever increasing number of nuclear reactors are now operating at high specific power level, utilizing enriched uranium as a nuclear fuel. With each increase in the specific power of nuclear reactors, the fuel element designer is confronted with the requirement to provide fuel elements capable of withstanding more and more damage occasioned by the generation of fission product atoms in the fuel matrix in an effort to maintain the fuel recharging frequency low when the fuel burn-up rate is relatively high. Since with highly enriched uranium the uranium-235 cannot be diluted with uranium-238, as is possible in the case of the natural uranium fuel elements, other diluent materials must be used. Hence, the dispersion fuel concept for nuclear fuels has been developed. A dispersion type fuel element is defined as an element in which discrete particles of a fissionable material are dispersed in a predetermined manner in a continuous matrix of non-fissionable material. In order to minimize radiation damage and to provide metallic properties, the diluent material must predominate in volume and exist as a continuous matrix surrounding the fissionable phase. The matrix metal acts in effect as the structural material in the dispersion type fuel element.

In the dispersion concept for nuclear fuel elements, the arrangement of fissionable particles in the non-fissionable matrix is considered to be most desirable when each fissionable particle is sufficiently far apart from its adjacent fissionable particles so that fission fragments do not come to rest in overlapping zones in the non-fissionable matrix. That is to say that there should be an undamaged web of matrix material separating the dispersed fissionable particles. Experimental evidence obtained on several dispersion systems indicate that dispersion type fuel elements with overlapping fission product zones are more brittle than those elements whose fission product zones do not overlap. Fission gas retention has also been observed to be more satisfactory in dispersion type fuel elements where an undamaged web of matrix material surrounds the dispersed fissionable particles. The object then in a dispersion type fuel element is to concentrate the fission product damage in the dispersed phase and in a highly localized region surrounding each dispersed fissionable particle, leaving a damage free region of matrix material around the zone of damage. Since the major contributing effect of the fission product damage is the high energy recoiling products, it is most desirable to have dispersed fissionable particles that are of spherical geometry because for this geometry a minimum amount of fission products recoil into the surrounding matrix material.

In order to obtain a dispersion type fuel element containing spherical fissionable particles in a non-fissionable matrix wherein each fissionable particle is sufficiently far apart from its adjacent fissionable particles, the mixing of the fissionable and non-fissionable particles assumes paramount importance in the production of these type of elements. For, it is the mixing operation that achieves or fails to achieve that uniform and unsegregated dispersion of the spherical fissionable particles in the non-fissionable matrix material that is required in order to avoid fragmentation and longitudinal alignment (otherwise known as "stringering") of the fissionable particles. The mixing operation is further complicated by the fact that it is necessary to blend spherically shaped high density particles of a fissionable material, such as uranium oxide, with much lower density particles of a non-fissionable material, such as zirconium base alloy. Efforts directed at achieving uniform and unsegregated dispersion by conventional blending techniques, as for instance by tumbling, having been for the most part unsatisfactory. It has been observed that the high density fissionable particles tended to segregate during the blending operation. The resultant dispersion type fuel elements were brittle and ruptured easily during reactor operation because of fragmentation and stringering. Also, the cold compacting operation of the blended powders was carried out by using one die for the compacting and thereafter removing the powder compact from this die and inserting it into a picture frame for final processing into a dispersion type fuel element. As a result of the removal of the powder compact from the compacting die and its subsequent handling, including its insertion into the picture frame, the powder compact, more often than not, has been damaged at its edges and corners.

The present invention contemplates to resolve the mixing problem by the provision of an improved method for making dispersion type bodies from powders of dissimilar densities in which a uniform and unsegregated dispersion of the high density particles is achieved in the lower denstiy matrix material. By the term "uniform and unsegregated dispersion" as used in this specification and in the appended claims it is meant to define a dispersion in which a substantially constant volume fraction of the high density particles is found throughout the matrix material.

The object of the present invention, therefore, is to provide an improved method for making dispersion type bodies from powders of dissimilar densities in which a substantially uniform and unsegregated dispersion of the high density particles is achieved in the lower density matrix material. More specifically, the object of the present invention is to provide an improved method for making dispersion type fuel elements for use in nuclear reactors from powders of dissimilar densities in which a substantially uniform and unsegregated dispersion of the high density fissionable particles is achieved in the lower density non-fissionable matrix material. A further object of the present invention is to provide an improved method for making dispersion type fuel elements for use in nuclear reactors from powders of dissimilar densities in which the density and the character of the dispersed phase in the non-fissionable matrix may be controlled and varied. A still further object of the present invention is to provide an improved method for making dispersion type fuel elements for use in nuclear reactors from powders of dissimilar densities in which the fission product damage is concentrated in the dispersed phase and in a highly localized region surrounding each dispersed particle and in which, for most of the particles, a fission product free region of matrix material is left around the zone of damage. A still further object of the present invention is to provide an improved method for making dispersion type fuel elements for use in nuclear reactors from powders of dissimilar densities which elements are capable of withstanding a high degree of damage in the fuel matrix occasioned by the generation of fission product atoms without undue impairment of the stability of the fuel configuration. Still another object of the present invention is to provide an improved method for making dispersion type fuel elements for use in nuclear reactors from powders of dissimilar densities which elements are capable of sustaining high burn-up rates in reactors operating at high specific power levels.

Other and further objects of the invention will in part be obvious and will in part appear hereinafter.

The invention accordingly comprises the novel method for making dispersion type bodies from powders of dissimilar densities in which a substantially uniform and unsegregated dispersion of the high density particles is achieved in the lower density matrix material and possessing the steps and the construction which are exemplified in the following detailed disclosure, and the scope of which will be indicated in the appended claims.

For a fuller understanding of the nature and objects of the invention, reference should be had to the following detailed description, taken in connection with the accompanying drawings wherein.

Figure 1:
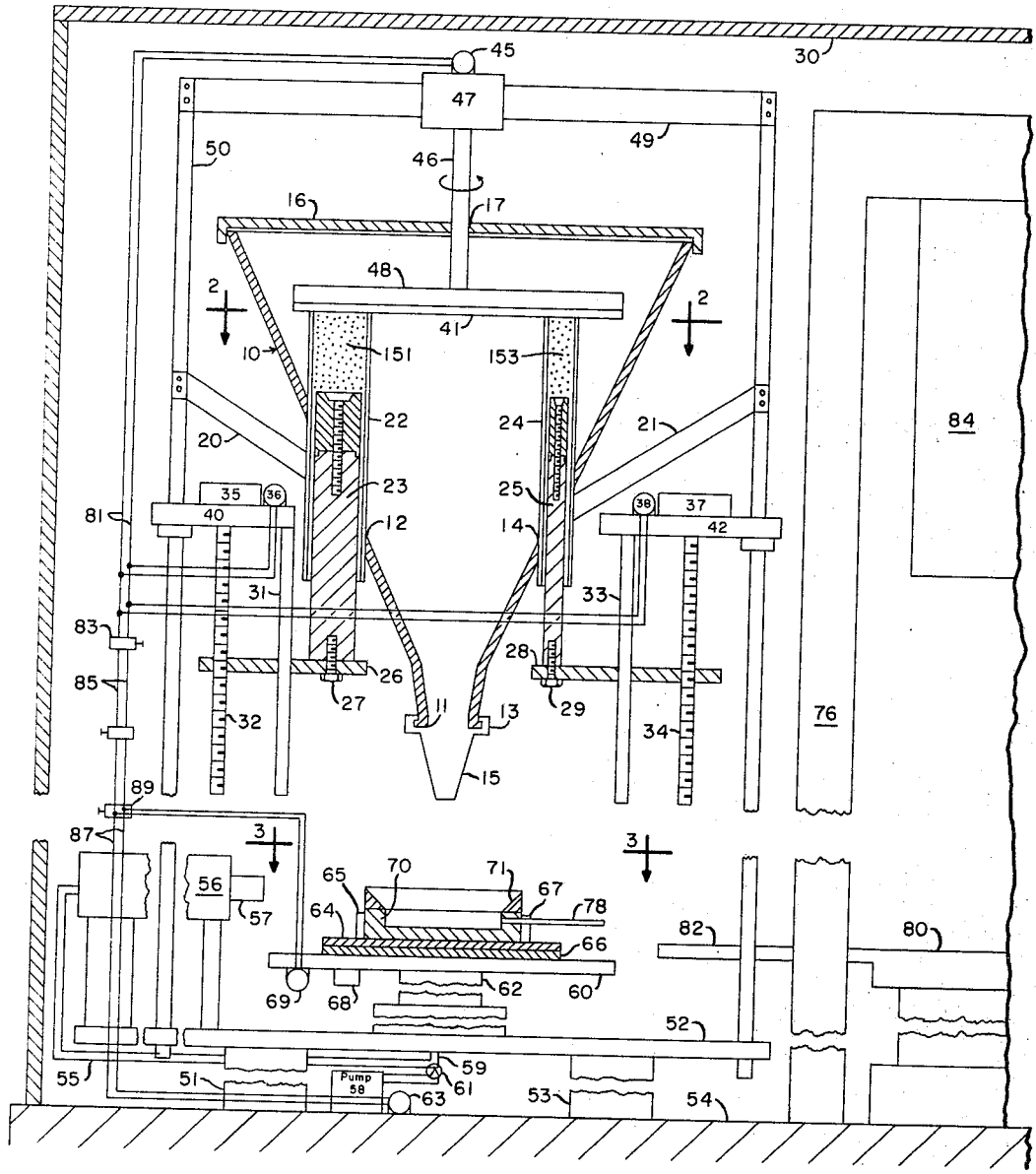
FIG. 1 is a side elevational view, partly in section, of one preferred embodiment of an apparatus constructed in accordance with the invention.
Figure 2:
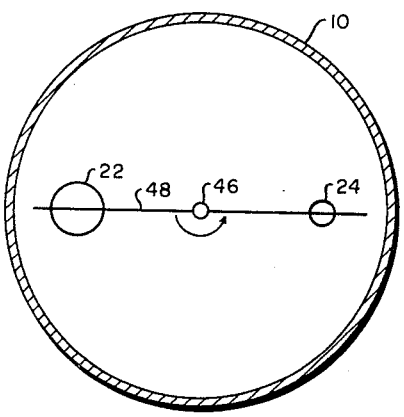
FIG. 2 is a fragmentary section taken on line 2—2 of FIG. 1.
Figure 3:
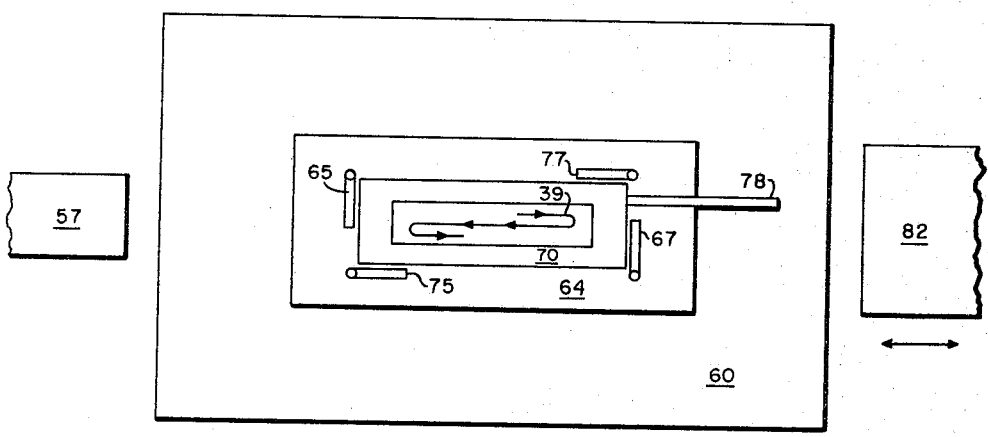
FIG. 3 is a fragmentary plan view taken on line 3—3 of FIG. 1.

Referring to the drawings in which like reference numerals refer to like parts throughout, in particular to FIGS. 1, 2, and 3, the reference character 10 denotes a conically shaped blending tank provided with a concentric bottom opening 11 having an annular rim 13 designed for removably holding a spout 15. Blending tank 10 is furthermore provided with ports 12 and 14 formed to receive hollow cylinders 22 and 24 respectively. It is to be noted that port 12 and cylinder 22 have greater diameters than port 14 and cylinder 24, the significance of which will be more fully appreciated from the description of the operation of the apparatus of the invention. It is to be further noted that the cylinders 22 and 24 are positioned within the blending tank 10 with their respective axes in vertically parallel spaced apart relationship. At the top, the blending tank 10 is provided with a convenient split cover 16 having a central hole 17 designed to accommodate the shaft 46 of a rotatable wiper blade 48. The wiper blade 48 is mounted for rotation within the blending tank 10 about an axis, defined by its shaft 46, which is intermediate to and parallel with the axes of the cylinders 22 and 24. The wiper blade 48 is, furthermore, provided with a resilient edge portion 41 arranged to cooperate with the upper ends of the cylinders 22 and 24.

The cylinders 22 and 24 are securely attached within ports 12 and 14 respectively of the blending tank 10, and are also firmly attached by convenient supporting arms 20 and 21 to a frame 50 mounted on a base plate 52. Base plate 52 is in turn supported by legs 51 and 53 at a distance above the floor 54 so as to bring the operative parts of the apparatus shown in FIG. 1 within the convenient reach of an operator. Pistons 23 and 25 are mounted within cylinders 22 and 24 respectively and are secured by set screws 27 and 29 to plates 26 and 28. Plates 26 and 28 respectively combine with guide bars 31 and 33, externally threaded rotatable rods 32 and 34, and platforms 40 and 42 to define respective independent piston drives for the pistons 23 and 25. Platforms 40 and 42 are securely attached to the frame 50 at a distance below the supporting arms 20 and 21. Platforms 40 and 42 carry gear boxes 35 and 37 and small electric motors 36 and 38 respectively. Each of the plates 26 and 28 is, furthermore, provided with a smooth bore to accommodate the guide bars 31 and 33 therein and an internally threaded bore to accommodate the externally threaded rotatable rods 32 and 34 therein.

A beam 49 constitutes the upper end of the frame 50. In its center, the beam 49 supports a gear box 47 and a small electric motor 45 which in turn drive the shaft 46 of the wiper blade 48. On the base plate 52 and in substantially the center of the frame 50 is mounted a vertically extendable hydraulic means 62 carrying a horizontal platen 60. It is to be observed that the distance separating the platen 60 from the bottom concentric opening 11 of the blending tank 10 may be conveniently varied by the hydraulic means 62. The platen 60 supports a table 64 mounted for motions in a horizontal plane upon a bed 66 removably secured to the platen 60. It is to be understood that the bed 66 is provided with appropriate guiding means to cooperate with complementary means provided in the underside of the table 64 to effect the desired motions of table 64 relative to the platen 60. These motions will be more fully described below, with particular reference to FIG. 3. In order to impart the desired motions to the table 64, a gear box and a small electric motor are attached to the underside of the platen 60. The table 64 is, furthermore provided with four clamps 65, 67, 75, and 77 in order securely to hold a die, such as a picture frame assembly 70, on the table 64.

On the base plate 52 and on one side of the hydraulic means 62 is mounted a hydraulic jack 56 having a laterally extendable member 57. The hydraulic jack 56 is furthermore mounted at a distance above the base plate 52 so that its extendable member 57 may be extended laterally at a level just above the level of the table 64 when the hydraulic means 62 is not vertically raised but rather it is in its lowermost position, as shown in FIG. 1. A pump 58, driven by a small electric motor 63, is located on the floor 54. Hydraulic liquid is pumped by the pump 58 through an appropriate valve 61 and a pipe 55 to the hydraulic jack 56 and through a pipe 59 to the hydraulic means 62.

The small electric motors 36, 38, and 45 are shown supplied with current through wires 81 fed from a control means 83 which in turn is connected to a source of power diagrammatically represented by the two wires 85. Similarly, the electric motors 63 and 69 are fed by wires 87 connected through a control means 89 to the two wires 85.

Adjacent the frame 50 supporting the blending tank 10 is mounted a compacting chamber 76. The compacting chamber 76 houses a hydraulic press means 80 having a laterally extendable table 82 and a stationary block 84 cooperating with the press means 80. An independent source of power (not shown) is provided to operate the hydraulic press means 80 and to bring it against the stationary block 84 under the desired pressure.

In instances where the apparatus of the invention is used for the making of dispersion type fuel elements for use in nuclear reactors, and in particular when working with finely powdered fissionable materials such as uranium-dioxide, it becomes of the utmost importance that the operators of the apparatus be protected from airborne contamination. In such instances, the apparatus is enclosed within a protection box, or as it is better known in the art, a dry box 30. Within this dry box 30, the atmosphere is kept under a slightly negative pressure. The dry box 30 is, furthermore, provided with a hood (not shown) connected to an exhaust system (not shown) and with at least two ports (not shown) having a pair of gloves (not shown) attached thereto by which the operator may conveniently reach the operative parts of the apparatus.

The operation of the preferred embodiment of the apparatus as shown in and described with reference to FIGS. 1, 2, and 3 is as follows. An appropriate non-fissionable matrix material in finely divided powder form 151 is introduced from the top into the hollow cylinder 22 with its piston 23 being withdrawn in its lowermost position. Such an appropriate non-fissionable matrix material may be zirconium or a zirconium base alloy, stainless steel, aluminum, beryllium oxide, graphite, silicon carbide, or thorium dioxide. Since the matrix material is in effect the structural material in the dispersion type body and because it is also the diluent material in the dispersion type fuel element, it predominates in volume. Therefore, the internal diameter of the cylinder 22 is considerably greater than the internal diameter of the cylinder 24. An appropriate fissionable fuel material, also in finely divided powder form 153, is introduced from the top into the smaller hollow cylinder 24 likewise with its piston 25 being withdrawn to its lowermost position. For best results, it is desirable to use fuel powder 153 of spherical geometry and of substantially uniform size. Uniformity in size of the spherical fuel particles 153 may be conveniently achieved by successive screening through appropriate sieves. Such a suitable fissionable fuel material may be uranium dioxide, uranium carbide, uranium dicarbide, or other intermetallic compounds of uranium as $UAl_2$, $UAl_3$, $UAl_4$, $Be_{13}$, $U_6Fe$, $UFe_2$, $UN$, $UPb$, $U_3Si_2$, and $U_5Sn4$.

Once the cylinders 22 and 24 have been filled with non-fissionable matrix powder 151 and with fissionable fuel powder 153, a die member, such as a picture frame assembly 70, is secured to the table 64 by clamps 65, 67, 75, and 77, as may be best observed in FIG. 3. The picture frame assembly 70 is made of a suitable material to serve as the cladding of a dispersion type nuclear fuel element. Such suitable cladding material may comprise zirconium, zirconium base alloy, stainless steel, or any like material specified by the designer of the nuclear reactor for which the dispersion type nuclear fuel element is being prepared.

With the picture frame assembly 70, together with a guard 71, secured onto the table 64, the operator switches on control means 89 to feed power through wires 87 to electric motor 63 which in turn actuates pump 58. The pump 58 then pumps hydraulic liquid through control valve 61 and pipe 59 to hydraulic means 62. The hydraulic means 62 is thereby vertically extended, bringing the picture frame assembly 70 into close proximity to the bottom concentric opening 11 of the blending tank 10. For best results, the picture frame assembly 70 should be only inches away from the end of the removable spout 15 attached to the opening 11. Thereafter, the operator switches on control means 83 to feed power through wires 81 to the electric motors 45, 36, and 38. The electric motor 45 actuates the gears within gear box 47 to drive the shaft 46 of the rotatable wiper blade 48. It must be pointed out that the gear box 47 is being provided with appropriate means (not shown) whereby the rotational velocity of the wiper blade 48 may be varied and adjusted according to the operational need of the apparatus. The electric motors 36 and 38 respectively actuate gears within gear boxes 35 and 37 to rotate thereby the externally threaded rotatable rods 32 and 34. It is to be noted that the rotational speed of the rods 32 and 34 may be individually adjusted. It is to be further noted that, under certain operational requirements, rod 32 may be rotated at a somewhat greater speed than rod 34. This is necessary in order to drive piston 23 faster than piston 25 since the relative discharge of the powders 151 and 153 with respect to the volume of one as compared to the other is determined by both the comparative internal diameters of the cylinders 22 and 24 and the comparative rates of advance of the pistons 23 and 25. The rotating externally threaded rods 32 and 34 cooperate with the internally threaded bores provided in the plates 26 and 28 and force these plates 26 and 28 to move upwards along the axial lengths of the rods 32 and 34 as guided by the respective guide bars 31 and 33. The plates 26 and 28 in turn drive their respective pistons 23 and 25 upwards within the hollow cylinders 22 and 24.

As the pistons 23 and 25 advance upwards within the cylinders 22 and 24, they force non-fissionable matrix powder 151 and fissionable fuel powder 153 toward the free upper ends of the cylinders 22 and 24 where the rotating wiper blade 48 through the sweeping action of its resiliant edge 41 continuously removes discrete amounts of the powders 151 and 153 and discharges these amounts into the conically shaped blending tank 10. The powders bounce off the wall of the blending tank 10 and fall by gravity through the bottom concentric opening 11 and removable spout 15 into the picture frame assembly 70.

Figure 10:
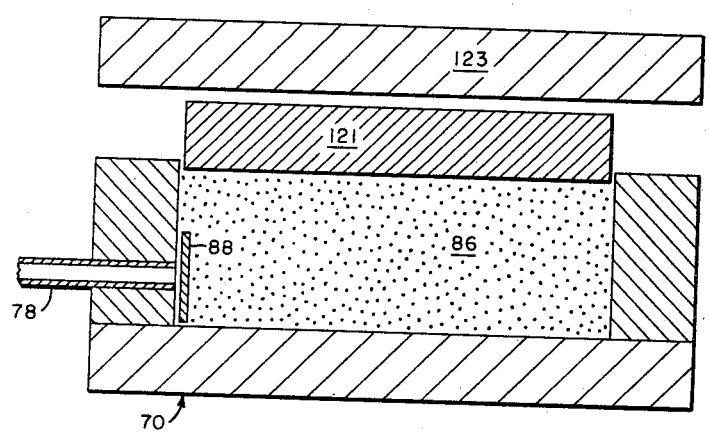
FIG. 10 is a side elevational view, in section, of a die, such as a picture frame, filled with blended powder.

When the operator switched on control means 89, power was also fed through wires 87 to electric motor 69 which in turn actuated the gears within the gear box 68. These gears within the gear box 68 engage with the guiding means (not shown) provided in the stationary bed 66 which guiding means in turn cooperate with complementary means (not shown) provided in the underside of the table 64 in order to impart to the table 64 and to the attached picture frame assembly 70 a motion such as shown by the arrow 39 in FIG. 3. It is to be noted that the motion of the table 64 relative to the platen 60 is a continuous one. It is to be further noted that by this motion of table 64, the picture frame assembly 70 is continuously passed back and forth under the removable discharge spout 15 of the blending tank 10. During this reciprocating motion of the picture frame assembly 70 relative to the discharge spout 15, a uniformly blended mixture of the powders 151 and 153 is continuously being discharged in overlapping layers into the picture frame assembly 70 until the same is filled. Guard 71 serves to prevent wastage of the powders onto the platen 60. When the picture frame assembly 70 is filled with the uniformly blended mixture of the powders 151 and 153, the control means 83 is switched off and power is thereby cut off to the motors 45, 36 and 38. The rotation of the wiper blade 48 and the upward advance of the pistons 23 and 25 are thus halted and further discharge of blended powders through the spout 15 is stopped. Then control means 89 is adjusted to cut off power to motor 69 while feeding power to motor 63. Motor 63 actuates pump 58 to withdraw hydraulic liquid from hydraulic means 62, causing thereby to lower platen 60 away from the discharge spout 15 until the platen 60 comes to rest in its lowermost position, substantially as shown in FIG. 1. The operator now removes guard 71, and places a top insert 121 on top of the powders and loosens clamps 65 and 67 and turns them ninety degrees away from the picture frame assembly 70. By adjusting the valve 61, hydraulic liquid is then transmitted through pipe 55 to the hydraulic jack 56, causing its members 57 to extend laterally toward the picture frame assembly 70. Simultaneously therewith, table 82 of the hydraulic press means 80 is also extended laterally by an independent means (not shown) until the end of table 82 comes to rest against the side of the table 64. Member 57 continues in its lateral extension until it transfers the now filled picture frame assembly 70 from the table 64 to the table 82. During this transfer, the side clamps 75 and 77 remain in position, and act in effect as guides, preventing the picture frame assembly 70 from veering off its course. Once the filled picture frame assembly 70 has come to rest in substantially the center of the table 82, the table 82 is withdrawn into the compacting chamber 76. Within the compacting chamber 76, the picture frame assembly 70 containing the blended powders 86 and with the top insert 121 in place on top of the powders 86, as may be best observed in FIG. 10, is cold compacted by advancing hydraulic press means 80 against the stationary block 84 and maintaining the pressure on the picture frame assembly 70 until the top side of the insert 121 is flush with the upper end of the picture frame assembly 70. The blended powders 86 within the picture frame assembly 70 are prevented from entering the evacuation tube 78 by a thin piece of metal, such as a shim 88, which has been placed within the picture frame assembly 70 when the same was secured to the table 64. With the blended powders 86 cold compacted within the picture frame assembly 70, the same is removed from the compacting chamber 76; a cover plate 123 is then placed on the picture frame assembly 70 and securely welded thereto. Thereafter, the picture frame assembly 70 is evacuated via evacuation tube 78 to an internal vacuum of at least 0.04 microns of mercury, and the tube 78 is sealed by welding. The evacuated picture frame assembly 70 is now ready for final fabrication to shape by hot and cold working into a finished fuel element.

It must be pointed out that the cold compacting operation should be carried out as rapidly as possible after the picture frame assembly 70 has been filled with the blended powders 86. This is necessary in order to prevent possible segregation of the uniformly blended powders 86 within the picture frame assembly 70, which might otherwise occur due to unnecessary delay and possible unintentional vibration of the picture frame. Furthermore, it is pointed out that the heretofore existing problem of the powder compact becoming damaged has been eliminated by cold compacting to blended powders 86 within the same die, that is the pcture frame assembly 70, within which it will be processed into a final dispersion type fuel element.

Figure 12:
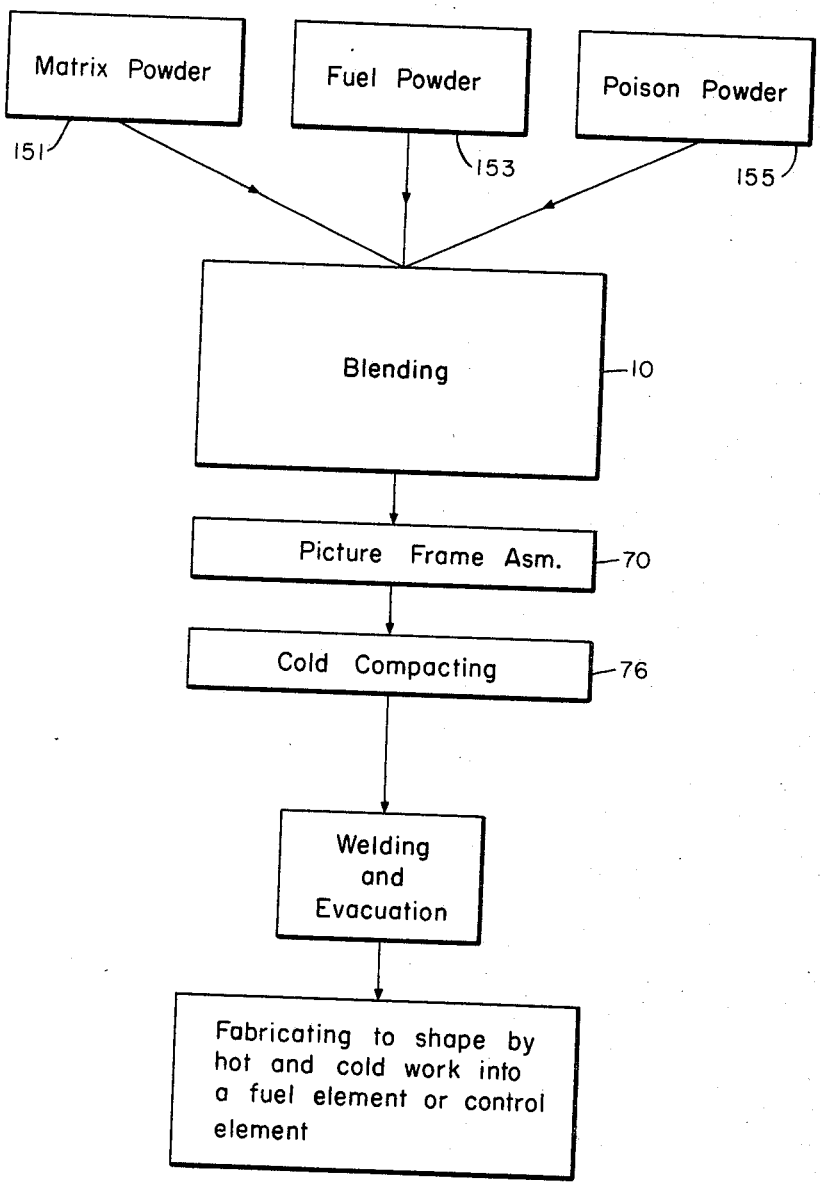
FIG. 12 is a schematic representation of the steps of the invention.

The above described steps of the invention may be most conveniently followed by viewing FIG. 12, which is a schematic representation of the steps of the invention. It should be evident from viewing FIG. 12 that in place of fuel powder 153, an appropriate nuclear poison powder 155 may likewise be blended with a matrix powder 151 to produce a nuclear control element. Furthermore, it should also be evident from viewing FIG. 12 that both a fuel powder 153 and a poison powder 155 may also be blended with a suitable matrix powder 151 to produce a different kind of nuclear fuel element. Such an appropriate nuclear poison powder 155 may be boron carbide or zirconium diboride.

Figure 5:
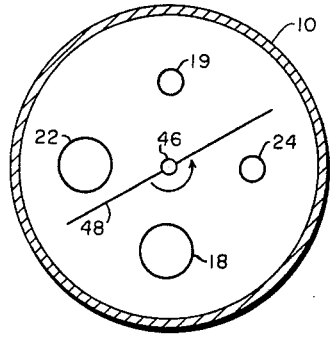
FIGS. 5, 6, 7 and 8 are views similar to FIG. 2 but each showing a modification of the apparatus of FIG. 1.
Figure 6:
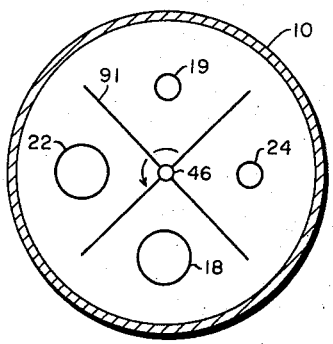
Figure 7:
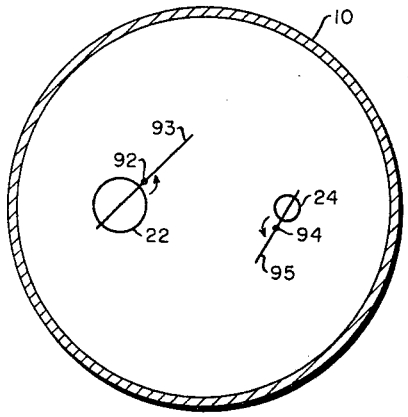
Figure 8:
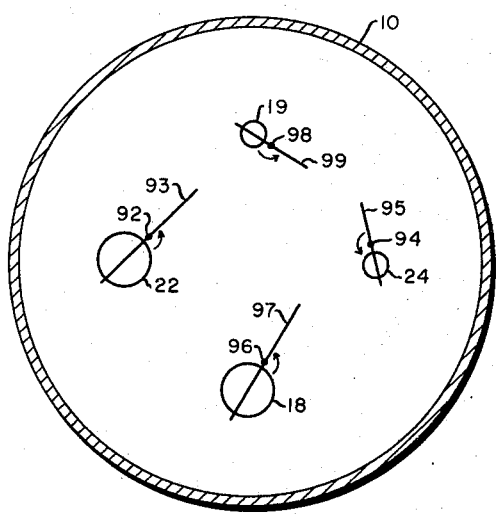

When it is desired to produce a nuclear fuel element containing both fuel particles and poison particles in uniform and unsegregated dispersion in a non-fissionable matrix, it becomes necessary to modify the apparatus of FIG. 1 by incorporating two more cylinders into the blending tank 10, as may be observed in FIGS. 5, 6, and 8. In these modifications, cylinders 18 and 19 have been incorporated into the blending tank 10 in addition to the cylinders 22 and 24. It is to be understood that each one of the added cylinders 18 and 19 is mounted in like fashion as the cylinders 22 and 24 and is also provided with independent pistons and piston drives. The arrangement shown in FIG. 6 introduces a further modifications in that it provides for a cross-shaped wiper blade 91 secured to the same central shaft 46. This arrangement permits a reduction in the rotational velocity of the shaft 46, as compared to the arrangement shown in FIG. 1. The modification depicted in FIG. 7 shows two wiper blades 93 and 95 eccentrically mounted about independent shafts 92 and 94 respectively. It is to be understood that each one of the shafts 92 and 94 is provided with its independent drive (not shown). This modification allows for the adjustment in the rotational speeds of the two independent wiper blades 93 and 95 relative to each other. The modification shown in FIG. 8 shows this concept applied to four cylinders 22, 24, 18, and 19, with each cylinder being provided with its respective independent eccentrically mounted wiper blade 93, 95, 97, and 99, about eccentric shafts 92, 94, 96, and 98.

Figure 11:
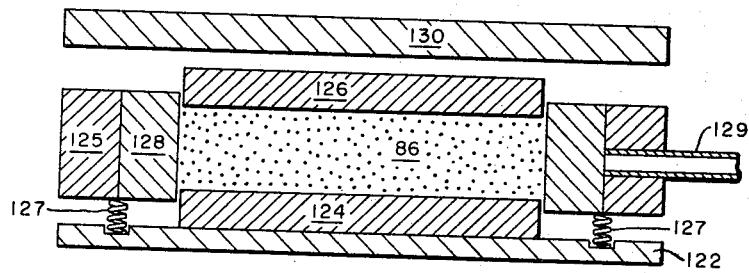
FIG. 11 is a view similar to FIG. 10 but showing a different die, such as another kind of a picture frame, filled with blended powder.

FIG. 11 is a view similar to FIG. 10 but shows a different picture frame assembly filled with blended powders 86. This picture frame assembly comprises a hardened steel plate 122, a bottom insert plate 134, an outer picture frame 125 telescopically holding an inner picture frame 128, with the two picture frames 125 and 128 supported by suitable coil springs 127, 127 on the plate 122. It is to be understood that the picture frame assembly may be secured in like fashion to the table 64 of the platen 60 by means of the clamps 65, 67, 75, and 77 as picture frame assembly 70. The picture frame assembly is also provided with an evacuation tube 129 reaching through the outer frame 125 but not through the inner frame 128. Thus, there is here no need for the provision of a shim to be placed into the tube 129. The bottom and top insert plates 124 and 126 are preferably formed of the same metal such as zirconium or zirconium alloy, as is the inner frame 128. After compacting, the cover plate 130 and a like bottom cover plate in lieu of the plate 122 are welded to the outer frame 125 and the picture frame assembly is evacuated in like manner as described above. The final fabrication to shape to produce a nuclear fuel or control element by hot and cold working of the picture frame assembly must of necessity include a step to remove the outer metal cladding by convenient means, such as for instance by pickling.

Figure 4:
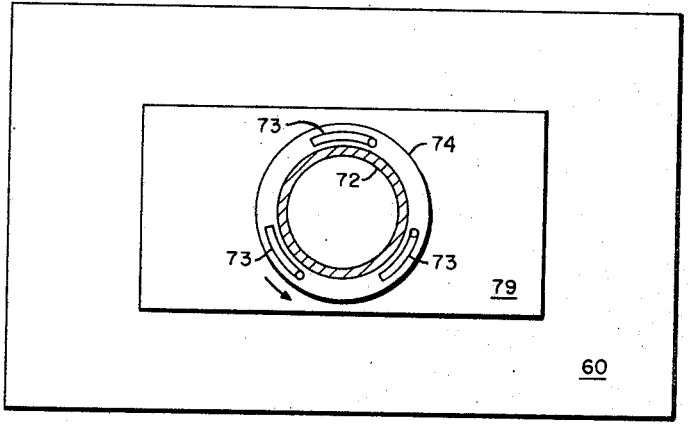
FIG. 4 is a view similar to FIG. 3 but showing a modification thereof.

For some applications, it is desirable to fill a cylindrical container with uniformly blended powders instead of a picture frame. The apparatus of the invention is equally adapted for this purpose with some modification. FIG. 4 is a view similar to FIG. 3 but shows this modification in the movable arrangement mounted on the platen 60. In place of the table 64 and the bed 66, there is mounted on the platen 60 a laterally movable plate 79 provided with a rotatable circular member 74. An appropriately designed gear box (not shown) mounted on the underside of the platen 60 and actuated by the electric motor 69 transmits lateral motion to the plate 79 and also imparts slow rotational motion to the member 74. It is to be understood that the extent of the lateral motion of the plate 79 is adjusted to correspond to the internal diameter of the particular cylindrical container 72 secured to the rotatable member 74 by the quadrantal clamps 73, 73, 73. It is to be further understood that the lateral motion is reciprocating so that the blended powders discharging from the spout 15 of the blending tank 10 are allowed to fall in successive and even layers into the cylindrical container 72.

The apparatus of the invention, particularly the modifications as described with reference to FIGS. 7 and 8, is also adapted to produce dispersion type fuel elements in which the concentration of the dispersed fuel phase is greater at the ends of the element than it is in the center of the element. Such fuel elements find important uses in reactors where there is a special need to flatten the neutron flux. With reference to FIGS. 4, 7, and 8, such dispersion type fuel elements may be produced as follows.

At the beginning of the blending operation, the fuel particles contained in the smaller diameter cylinders 19 and 24 are delivered therefrom to the blending tank 10 in larger amounts by the greater rates of advance of the piston drives in the smaller cylinders 19 and 24 as well as the faster rotation of the wiper blades 95 and 99. As the blending operation progresses, the rates of advance of the piston drives in the smaller cylinders 19 and 24 as well as the rotational speeds of the wiper blades 95 and 99 are gradually reduced and maintained at that reduced speed until after somewhat more than one half of the axial length of the cylindrical container 72 has been filled with the blended powders.

Thereafter, the rates of advance of the piston drives in the cylinders 19 and 24 as well as the rotational speeds of the wiper blades 95 and 99 are once again gradually increased until the cylindrical container 72 is completely filled at its top end with the blended powders. It should be noted, however, that throughout the blending operation in the filling of the cylindrical container 72, the rates of advance of the piston drives in the larger cylinders 18 and 22 as well as the rotational speeds of the wiper blades 93 and 97 are maintained constant. Thus, the bottom end and the top end of the cylindrical container 72 will have received a larger proportional amount of fuel powder than did the middle portion of the cylindrical container 72.

Figure 9:
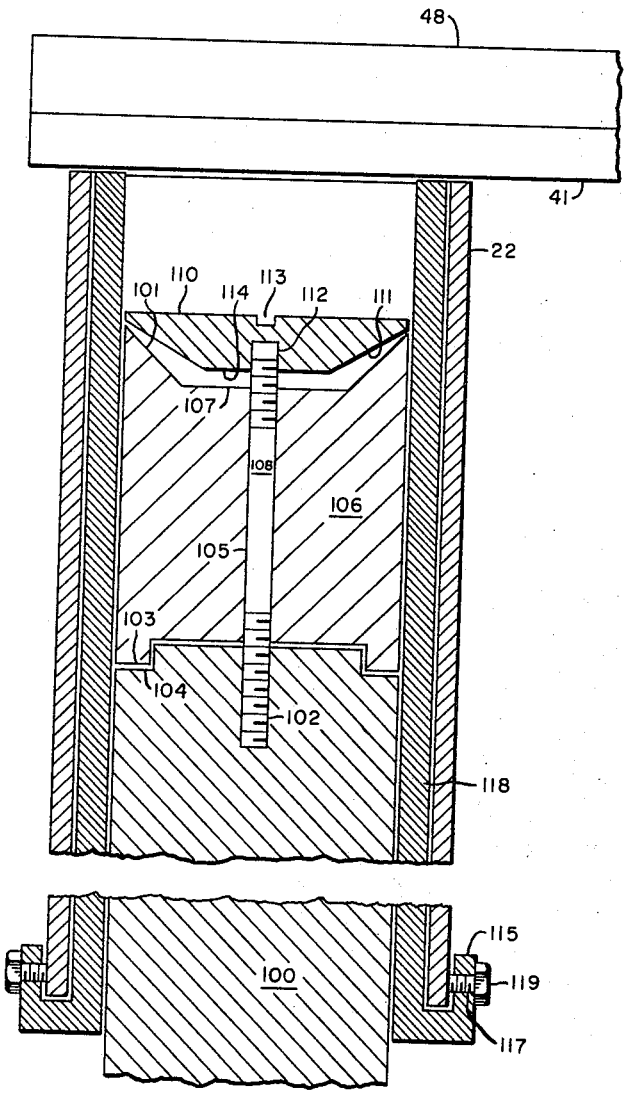
FIG. 9 is a sectional elevational view, on an enlarged scale, of a cylinder provided with an insert, a piston in partially assembled relation within the cylinder, and a fragmentary elevational view of a wiper blade.

FIG. 9 is a sectional elevational view, on an enlarged scale, of a cylinder 22 provided with an insert 118, a piston 100 in partially assembled relation within the cylinder, and a fragmentary elevational view of a wiper blade 48 having a resilient edge portion 41 cooperating with the upper end of the cylinder 22. By means of the insert 118, the internal diameter of the cylinder 22 may be varied and adjusted to the desired size required for the particular blending operation. The insert 118 is provided with an annular flange 115 having a number of internally threaded bores 117 to receive set screws 119 by means of which the insert 118 is conveniently secured within the cylinder 22. The steel portion of the piston 100 is provided with an annular depression 104 and a concentric, internally threaded bore 102. A plastic portion 106, preferably made of a tough, resilient material, forms the upper end of the piston 100. This plastic portion 106 is provided with an annular rim 103 to fit snugly into the annular depression 104 of the steel portion, a smooth concentric bore 105, and a central plateau 107 having a tapered side 101. The central plateau 107 with its tapered side 101 is designed to receive a metal expander 110 formed with circular bottom 114 and tapered side 111. The metal expander 110 is likewise provided with a concentric, internally threaded bore 112 to receive the upper, externally threaded end of rod 108 whose bottom, externally threaded end is formed to be received within the concentric, internally threaded bore 102 of the steel portion. The piston 100 is assembled as follows. The bottom end of the rod 108 is screwed into the concentric bore 102 and the plastic portion 106 is slipped over the rod 108 until its annular rim 103 comes snugly to rest on the annular depression 104 of the steel portion. Then metal expander 110 is screwed onto upper, externally threaded end of the rod 108 by means of a screw driver engaging the slit 113. As the metal expander 110 is screwed in, its tapered side 111 comes more and more in contact with the tapered side 101 of the central plateau 107 and begins to exert a radial pressure on the side 101. Thus, by means of this metal expander 110 the upper end of the plastic portion is adjusted to fit snugly and firmly within the insert 118, preventing thereby the powders from passing by the plastic portion 106.

Figure 13:
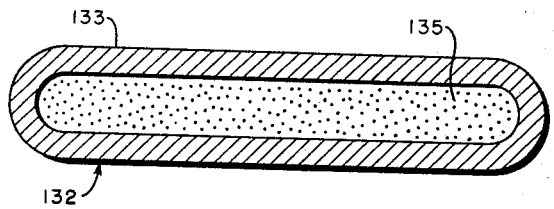
FIG. 13 is a side elevational view, in section, of a nuclear fuel plate made in accordance with the invention.
Figure 14:
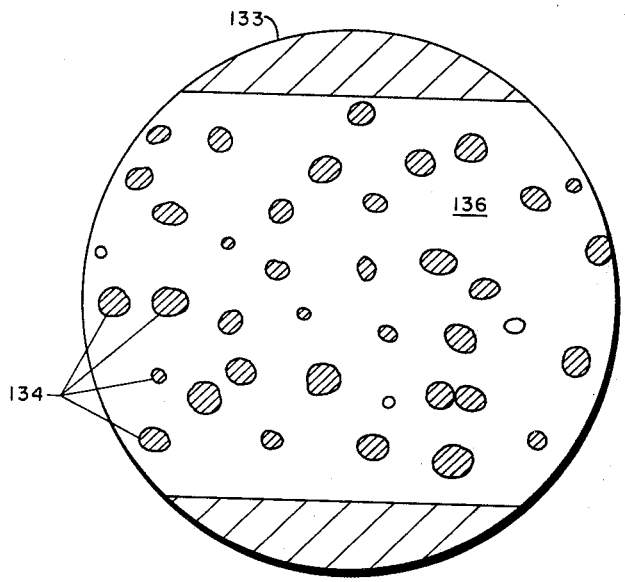
FIG. 14 is a view, on an enlarged scale, of a portion of the nuclear fuel plate shown in FIG. 13.
Figure 15:
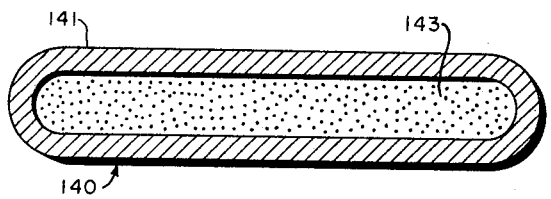
FIG. 15 is a side elevational view, in section, of a nuclear control plate made in accordance with the invention.
Figure 16:
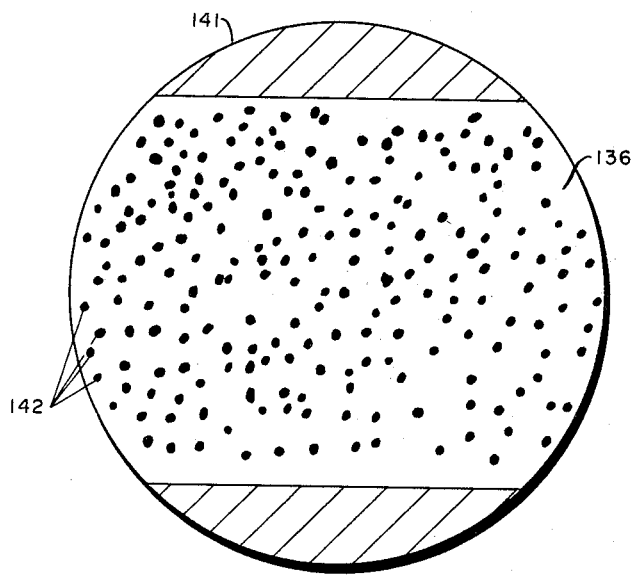
FIG. 16 is a view, on an enlarged scale, of a portion of the nuclear control plate shown in FIG. 15.
Figure 17:
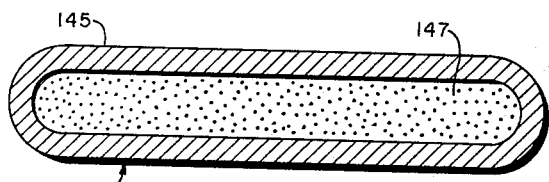
FIG. 17 is a side elevational view, in section, of another nuclear fuel plate made in accordance with the invention.
Figure 18:
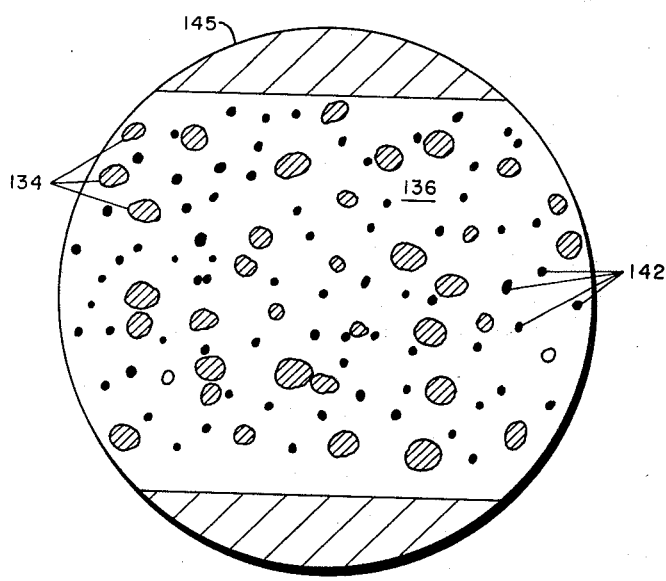
FIG. 18 is a view, on an enlarged scale, of a portion of the nuclear fuel plate shown in FIG. 17.

FIGS. 13, 15, and 17 are side elevational views, in section, of a nuclear fuel plate, a nuclear control plate, and another nuclear fuel plate respectively, and made according to the invention by the utilization of the apparatus of the invention as described above. FIGS. 14, 16, and 18 are views, on an enlarged scale, of portions of the respective plates shown in FIGS. 13, 15, and 17. The finished nuclear fuel plate 132, shown in FIG. 13, comprises a dispersion type core 135 and a zirconium or zirconium alloy cladding 133. As may be best observed in FIG. 14, the spherical fuel particles 134 are dispersed in a substantially uniform and unsegregated dispersion in the continuous matrix 136. The finished nuclear control plate 140, shown in FIG. 15, comprises a dispersed phase core 143 and a zirconium or zirconium alloy cladding 141. The poison particles 142, as may be best seen in FIG. 16, are uniformly dispersed in the continuous matrix 136. The finished nuclear fuel plate 146, shown in FIG. 17, also comprises a dispersed phase core 147 and a zirconium or zirconium alloy cladding 145. The spherical fuel particles 134 and the poison particles 142 are shown dispersed in a substantially uniform and unsegregated manner in the continuous matrix 136.

The present invention thus provides a novel method for making dispersion type bodies from powders of dissimilar densities in which a uniform and unsegregated dispersion of the high density particles is achieved in the lower density matrix material.

Since certain changes may be made in the above described method without departing from the scope of the invention herein involved, it is intended that all matter contained in the above description or shown in the accompanying drawings shall be interpreted in an illustrative and not in a limiting sense.

What is claimed is:

1. A method of making dispersion type bodies from powders of dissimilar densities in which a substantially uniform and unsegregated dispersion of high density particles is achieved in lower density matrix material comprising introducing low density powders in a first container and higher density powders in a second container, continuously and simultaneously removing discrete amounts of both said low and high density powders from said first and second containers by gradually forcing said powders toward the free ends of said containers where they are subjected to continuous wiping action, and achieving a uniform and unsegregated blend of said powders in a third container including said free ends of said first and second containers by permitting said powders to be bounced off from the wall thereof, gravity feeding amounts of said blended powders into a die positioned in close proximity to a bottom opening in said third container in volumes sufficient to fill said die, and compacting said powders within said die to form said dispersion type body.

2. A method of making dispersion type fuel elements for use in nuclear reactors from powders of dissimilar densities comprising the steps of introducing powders of dissimilar densities into hollow cylinders, continuously and simultaneously removing discrete amounts of said powders from said cylinders by gradually forcing said powders toward the free ends of said cylinders where they are subjected to continuous wiping action, blending said powders into a uniform and unsegregated mixture, by permitting said powders to be bounced off from the wall of a container including said free ends of said cylinders, feeding by gravity predetermined amounts of said mixture into a die positioned in close proximity to a bottom opening in said container, and compacting said mixture within said die.

References Cited

UNITED STATES PATENTS

| | | | |
|---|---|---|---|
| 2,898,660 | 8/1959 | Maxwell | 264—122 |
| 2,959,823 | 11/1960 | Schwabe et al. | 18—59.2 |
| 2,987,777 | 6/1961 | Beaver | 18—59.2 |
| 3,011,960 | 12/1961 | Williams et al. | 264—122 |
| 3,018,512 | 1/1962 | Kindseth | 18—4 |
| 3,058,150 | 10/1962 | Makowski | 18—4 |

ROBERT F. WHITE, *Primary Examiner.*

MORRIS LIEBMAN, *Examiner.*

J. R. HALL, M. H. ROSEN, *Assistant Examiners.*